United States Patent [19]

Burgdorf et al.

[11] Patent Number: 4,577,731
[45] Date of Patent: Mar. 25, 1986

[54] FLOATING CALIPER SPOT TYPE DISC BRAKE

[75] Inventors: Jochen Burgdorf, Offenbach-Rumpenheim, Fed. Rep. of Germany; Alfred Birkenbach, Rochester, Mich.; Ulrich Klimt, Gross-Umstadt, Fed. Rep. of Germany

[73] Assignee: ITT Industries, Inc., New York, N.Y.

[21] Appl. No.: 685,606

[22] Filed: Dec. 27, 1984

Related U.S. Application Data

[63] Continuation of Ser. No. 440,102, Nov. 8, 1982, abandoned.

[30] Foreign Application Priority Data

Dec. 16, 1981 [DE] Fed. Rep. of Germany ....... 3149883

[51] Int. Cl.$^4$ ............................................. F16D 65/14
[52] U.S. Cl. ................................ 188/73.33; 188/73.34; 188/73.36; 188/73.44; 188/73.45
[58] Field of Search ............... 188/73.33, 73.34, 73.35, 188/73.36, 73.38, 73.39, 73.43, 73.44, 73.45

[56] References Cited

U.S. PATENT DOCUMENTS

| | | | |
|---|---|---|---|
| 3,625,314 | 12/1971 | Rinker | 188/73.43 X |
| 3,768,605 | 10/1973 | Carre | 188/73.36 |
| 3,958,667 | 5/1976 | de Gennes | 188/73.43 |
| 4,003,453 | 1/1977 | Mathias | 188/73.43 X |
| 4,034,858 | 7/1977 | Rath | 188/73.34 |
| 4,046,233 | 9/1977 | Klassen | 188/73.44 |
| 4,267,904 | 5/1981 | Belart | 188/73.45 |
| 4,331,221 | 5/1982 | Evans et al. | 188/73.44 |
| 4,351,420 | 9/1982 | Burgdorf | 188/73.45 |
| 4,360,079 | 11/1982 | Belart | 188/73.43 X |
| 4,392,559 | 7/1983 | Oshima | 188/73.35 X |
| 4,467,898 | 8/1984 | Courbot et al. | 188/73.44 |

FOREIGN PATENT DOCUMENTS

| | | | |
|---|---|---|---|
| 30502 | 6/1981 | European Pat. Off. | 188/73.34 |
| 2538565 | 3/1976 | Fed. Rep. of Germany . | |
| 2635823 | 2/1977 | Fed. Rep. of Germany | 188/73.44 |

Primary Examiner—George E. A. Halvosa
Attorney, Agent, or Firm—James B. Raden

[57] ABSTRACT

A floating-caliper spot-type disc brake comprises a brake support member with two radially extending brake-shoe carrying and guiding arms and a floating caliper arranged between the arms. The floating caliper is axially guided by at least one axial bolt supported on the brake support member. For securing the floating caliper in position while mounting or dismounting the axial bolt, both circumferential sides of the floating caliper are provided with extensions which radially inwardly engage underneath abutments disposed on the associated brake-shoe carrying and guiding arms.

8 Claims, 4 Drawing Figures

FLOATING CALIPER SPOT TYPE DISC BRAKE

This application is a continuation of application Ser. No. 440,102, filed 11-8-82, now abandoned.

BACKGROUND OF THE INVENTION

The present invention relates to disc brakes in general, and more particularly to a floating-caliper spot-type disc brake.

Conventional brakes of this type usually include a brake carrier member which is preferably located at the inner side of the wheel. Two brake-shoe carrying and guiding webs extend substantially radially from the carrier member in a circumferentially spaced relationship. These webs axially straddle the brake disc and directly support the brake shoes. A floating caliper member is interposed between the brake-shoe carrying and guiding webs and carries a hydraulic piston-and-cylinder arrangement on the inner side of the wheel. The caliper member transmits the clamping or braking force to the outward brake shoe which is situated across the brake disc from the piston-and-cylinder arrangement. The floating caliper member is axially guided by at least one axial bolt supported at the brake support member. The floating caliper member has on one circumferential side in the area of the outward brake shoe a tooth-shaped extension engaging from radially inwardly a stop of the brake-shoe carrying and guiding webs. Both circumferential sides of the floating caliper member are guided in a circumferential direction between the brake-shoe carrying and guiding webs.

There are also already known floating-caliper spot-type disc brakes of different designs, among them such wherein the floating caliper member is arranged in a fist-type manner between brake-shoe carrying and guiding webs of the brake carrier member and is guided by axial guiding pins provided at the brake carrier member. It is also possible to have the guiding pin formed at the floating caliper member and guided in a bushing of the brake carrier member, as disclosed in German published patent application No. 25 38 565.

To hold the floating or fist-type caliper member securely in position in a floating-caliper spot-type disc brake of this type not only in the circumferential direction but also in the radial direction, the floating caliper member has on its one side an extension or tooth by means of which it is hooked underneath a stop at the brake-shoe carrying and guiding web. It is a disadvantage of this arrangement that, during replacement of the brake shoes, the floating caliper member has to be urged against a brake shoe holding spring to enable mounting of the axial guiding pins. An accurate guiding of the caliper member is possible in this known arrangement only by using two axial guiding pins which are suitably disposed on both sides of the cylinder housing of the piston-and-cylinder unit. This, of course, limits the design choices and renders the disc brake unnecessarily expensive.

SUMMARY OF THE INVENTION

Accordingly, it is a general object of the present invention to avoid the disadvantages of the prior art.

More particularly, it is an object of the present invention to provide a floating-caliper spot-type disc brake which does not possess the disadvantages of the conventional disc brakes of this type.

It is still another object of the present invention to so construct the disc brake of the type here under consideration that the carrier member will maintain the caliper member in a mounted position relative to itself during the assembling operation without any forces external to the disc brake being applied to the caliper member.

Yet another object of the present invention is to so design the disc brake of the above type as to be able to easily insert the guiding pins for the caliper member into the associated guiding bores.

An additional object of the invention is to devise a disc brake of the above type which provides for safe operation with only one guiding pin, whether having only one such guiding pin to begin with, or upon loss of or structural damage to one of two originally provided guiding pins.

A concomitant object of the present invention is to develop a disc brake which is simple in construction, inexpensive to manufacture, easy to install and service, and reliable in operation nevertheless.

In pursuance of these objects and others which will become apparent hereafter, one feature of the present invention resides in a floating-caliper spot-type disc brake for use in cooperation with a brake disc mounted on a support for rotation about a disc axis relative thereto, which comprises a pair of brake shoes; means for supporting the brake shoes at opposite axial sides of the brake disc for movement substantially parallel to the disc axis toward and away from the brake disc, including a carrier member rigidly connected to the support at one of the axial sides of the brake disc and extending past the brake disc to the other axial side thereof; means for moving the brake shoes at least toward the brake disc to frictionally engage the same, including a caliper member so mounted on the carrier member for displacement substantially parallel to the disc axis as to straddle the brake disc and having two circumferentially spaced marginal portions, and an actuator including two relatively substantially axially displaceable elements arranged on the one axial side of the brake disc and one directly applying braking force to the closer one of the brake shoes while the other is rigid with the caliper member to transmit the braking force through the latter to the other of the brake shoes; means for guiding the caliper member on the carrier member for the axial displacement, including means for bounding at least one substantially axially extending guiding opening in one of the members, and at least one substantially axially extending guiding pin secured to the other of the members and slidingly received in the guiding opening; and abutment means on the carrier member for the caliper member, including two circumferentially spaced abutments on the carrier member each so disposed as to engage from radially outwardly one of the marginal portions of the caliper member. Advantageously, the carrier member has two circumferentially spaced arms extending from the one to the other of the axial sides of the brake disc and carrying the abutments and the caliper member has a bridge portion spanning the brake disc and situated between the arms, the bridge portion having the marginal portions. It is further advantageous when the marginal portions are constituted by tooth-shaped extensions of the caliper member protruding circumferentially from the latter.

A particular advantage of this construction is that after having been properly positioned between the brake-shoe carrying and guiding arms, the floating caliper member will assume a mounted position in which marginal portions or extensions provided on its two sides engage the two abutments. Advantageously, a brake shoe holding spring urges the caliper member into this mounted position. Thus, the floating caliper member will assume a well-defined radial position which readily allows for mounting of the guiding pins.

To provide sufficient space for the purpose of mounting the floating caliper member between the brake-shoe carrying and guiding arms, it is advantageous when, in accordance with a further aspect of the present invention, an undercut which extends substantially in the circumferential direction is arranged radially inwardly of one of the abutments, and when the floating caliper member has such a limited dimension in the radial direction, that the floating caliper member can be moved radially inwardly and then in the circumferential direction, while the brake-shoe holding spring is radially compressed, to such an extent that the marginal portion on the side opposite to the undercut can be moved past the associated abutment. Moreover, the floating caliper member is advantageously provided with a step adjacent to one of the abutments, this step being engageable with the mounted marginal portion when the floating caliper member is downwardly displaced. In this arrangement, the brake shoe holding spring can be arranged in a radially inwardly disposed indentation of the floating caliper member, which indentation has a dimension larger in the circumferential direction than the corresponding dimension of the brake shoe holding spring by such an amount that the floating caliper member is able to perform the circumferential movement relative to the brake shoe holding spring which is necessary for its insertion between the brake-shoe carrying and guiding arms.

In a first practical construction, one axial guiding pin is provided on each of the sides of the cylinder housing, while the two extensions and the abutments associated therewith are located in the area of the outward brake shoe only.

However, the construction according to the invention also renders it possible to manage with merely one guiding pin by arranging for the extension with associated abutment to be disposed in the area of the outward brake shoe on the same side the axial guiding pin is provided on, while each extension of the floating caliper member and the associated abutment on the brake-shoe carrying and guiding arm is provided both in the area of the outward and of the inward brake shoe on the other side of the cylinder housing.

BRIEF DESCRIPTION OF THE DRAWING

Above-mentioned and other features and objects of this invention will become more apparent by reference to the following description taken in conjunction with the accompanying drawing, in which.

DETAILED DESCRIPTION OF THE PREFERRED EMBODIMENTS

Figure 1:
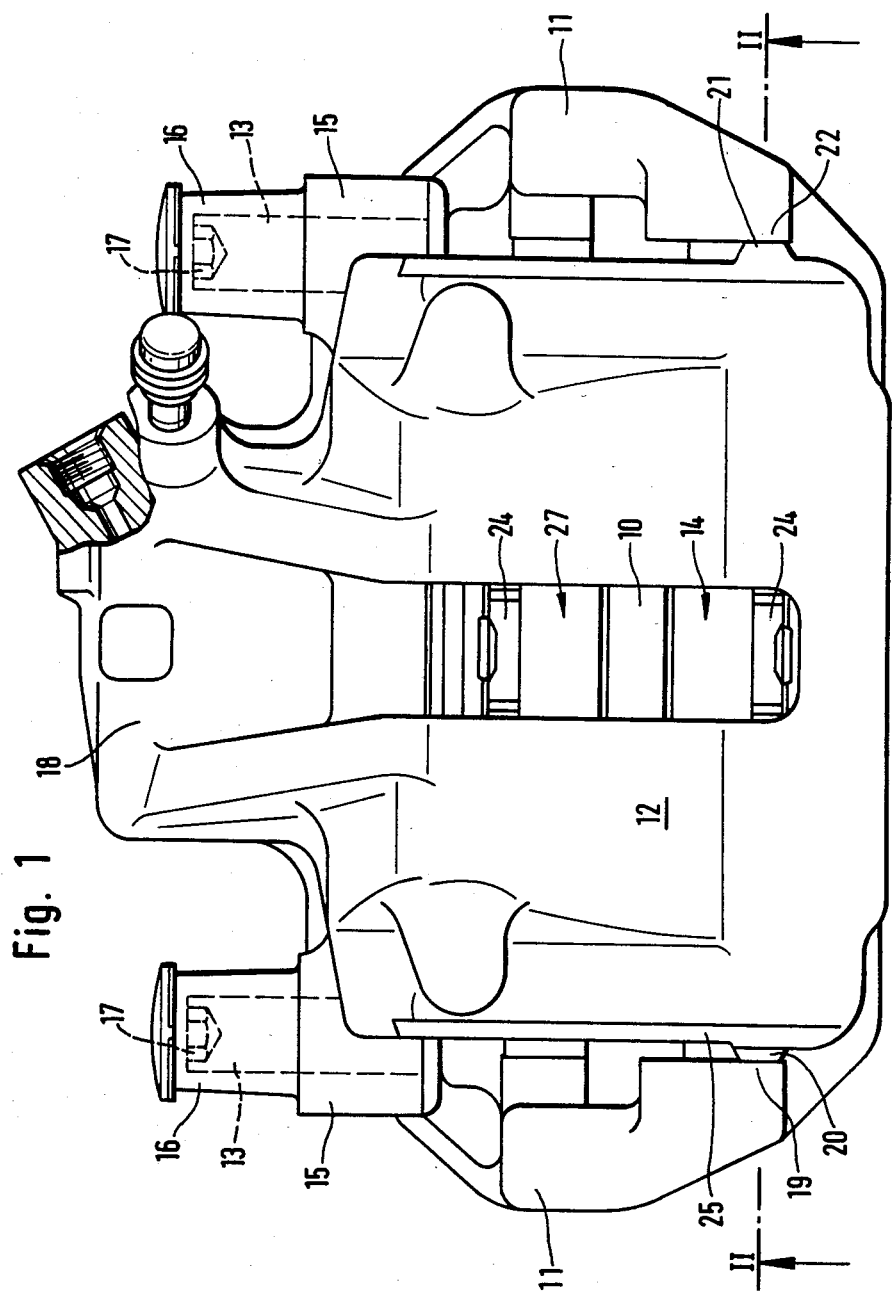
FIG. 1 is a radial top plan view of a floating-caliper spot-type disc brake embodying the invention.

Referring now to the drawing in detail, and first to FIG. 1, it may be seen that axial bolts 13 extend on the inner side of the floating-caliper spot-type disc brake from a brake carrier member and more particularly from brake-shoe carrying and guiding arms 11 extending therefrom normal relative to the plane of a brake disc 10. The axial bolts or guiding pins guide a floating caliper 12 in the axial direction, via guiding lugs 15 provided on the caliper 12. The bolts 13 are covered by an elastic protecting cap 16 located at the region of the lugs 15. For dismounting the floating caliper 12, the cover of the protecting cap 16 will be removed, whereupon the axial bolts 13 can be unscrewed, for instance, by a tool inserted into a hexagonal bore 17.

Figure 2:
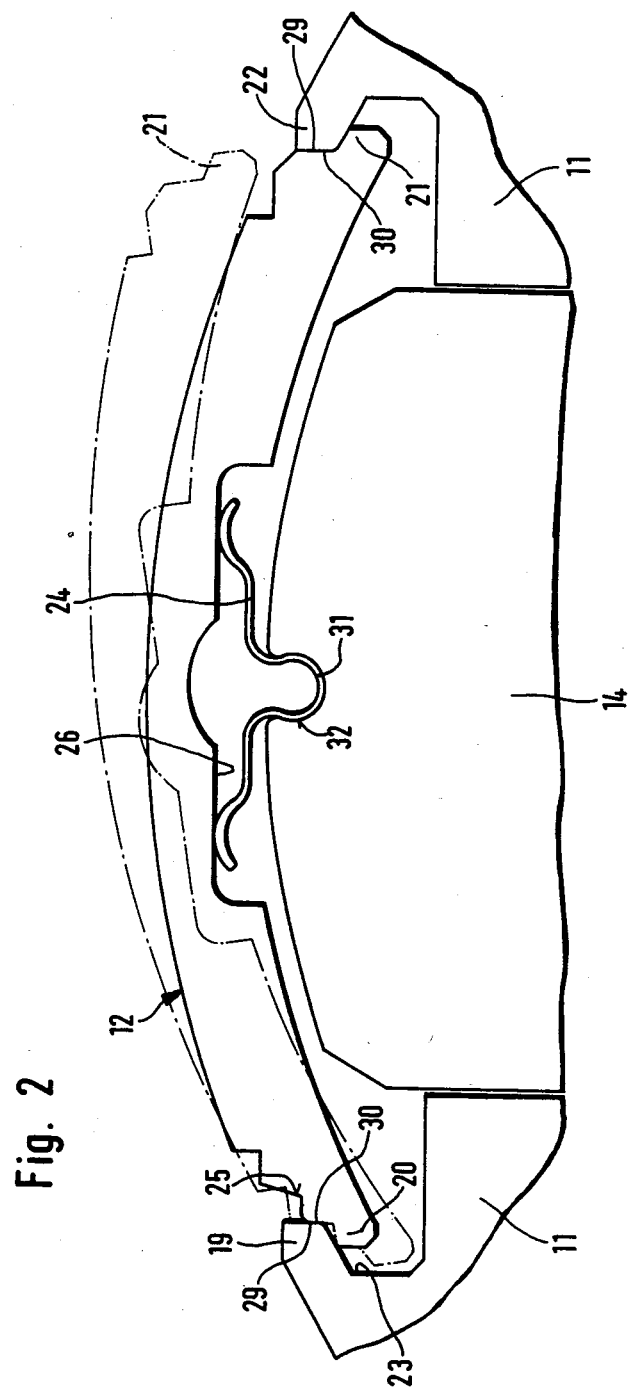
FIG. 2 is a sectional view taken along line II—II of FIG. 1.

As shown in FIGS. 1 and 2, an outward brake shoe 14 and an inward brake shoe 27 bear, through brake shoe holding springs 24, against the radially inner side of the floating caliper 12. Since the brake shoes 14, 27 bear radially inwardly against steps 28 disposed on the brake-shoe carrying and guiding arms 11 in a manner to be seen from FIG. 4, the floating caliper 12 will be urged radially outwardly by the brake shoe holding springs 24.

Referring to FIGS. 1 and 2, the floating caliper 12 carries on each of its circumferentially opposite ends approximately at the region of the outward brake shoe 14 one tooth or extension 20 or 21, by which it engages underneath abutments 19, 22 on the brake-shoe carrying and guiding arms 11. The extensions 20 and 21 merge into guiding surfaces 29 which extend approximately radially and by which the floating caliper 12 abuts on corresponding mating surfaces 30 of the brake-shoe carrying and guiding arms 11. In this manner, the floating caliper 12 is securely held in position in a circumferential and a radial direction at the region of the outward brake shoe 14. The brake shoe holding spring 24 exerts the radial force necessary to achieve this. A catching bead 31 of the brake shoe holding spring 24 is snapped into a corresponding catching indentation 32 of the brake shoes 14 and 27, respectively. Starting from the catching bead 31, the brake shoe holding spring 24 contains two arms opposing one another and extending in a circumferential direction. The arms of the spring 24 extend from radially inwardly into an indentation 26 of the floating caliper 12 and exert in this area the radially outwardly directed force on the floating caliper 12.

Adjacent to the left-hand guiding surface 29 as considered in FIG. 2, there is provided a step 25 which is of a configuration so long and deep that the floating caliper 12, when in its tilted position shown in broken lines in FIG. 2, is permitted to enter an undercut 23 beneath the abutment 19, the step 25 thus moving into abutment with the abutment 19. At the same time, the extension 21 on the opposite side of the floating caliper 12 must have become disengaged from the abutment 22 so that it can be guided past the latter inwardly or outwardly.

Owing to this design, mounting of the floating caliper 12 can be effected according to FIG. 2 by first moving the caliper 12 into the position illustrated in FIG. 2 in broken lines. Subsequently, the end carrying the extension 21 will be swung downwardly until the extension 21 is positioned radially inwardly of the abutment 22. As a result, the brake shoe holding spring 24 will be resiliently compressed. Displacement of the floating caliper 12 in FIG. 2 to the right until the step 25 disengages the abutment 19 again will enable the brake shoe holding spring 24 to urge the floating caliper 12 radially outwardly to adopt the position shown in full lines in FIG. 2 in which the extensions 20, 21 enter into engagement with the abutments 19, 22. Now the guiding surfaces 29, 30 will be in abutment with each other again. Since the caliper 12 is maintained in this position on the brake-shoe carrying and guiding arms 11 without any auxiliary means, the axial bolts 13 can now be inserted without any effort. Dismounting can be performed in a simple manner in the reverse order.

Figure 3:
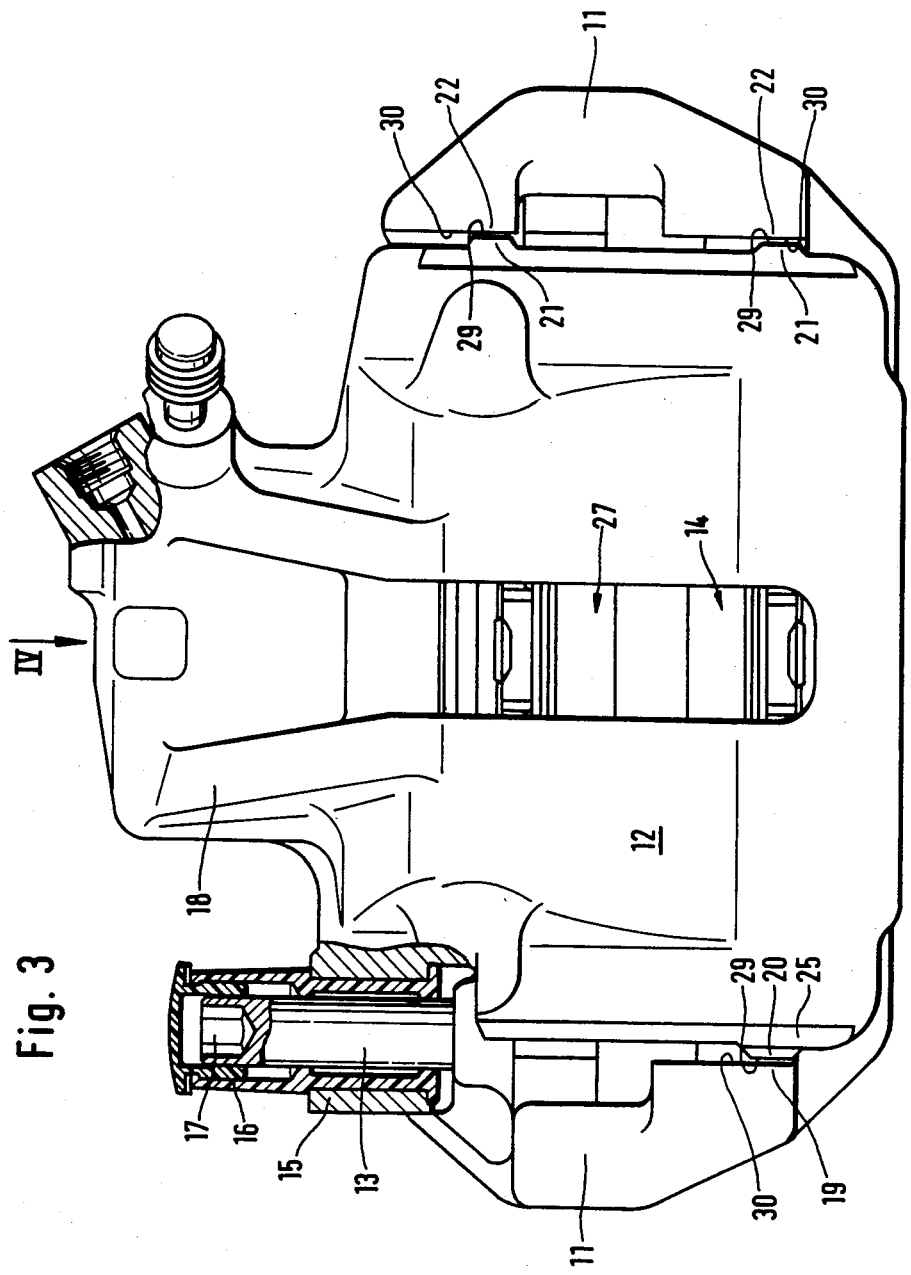
FIG. 3 is a radial top plan view of a modified floating-caliper spot-type disc brake.
Figure 4:
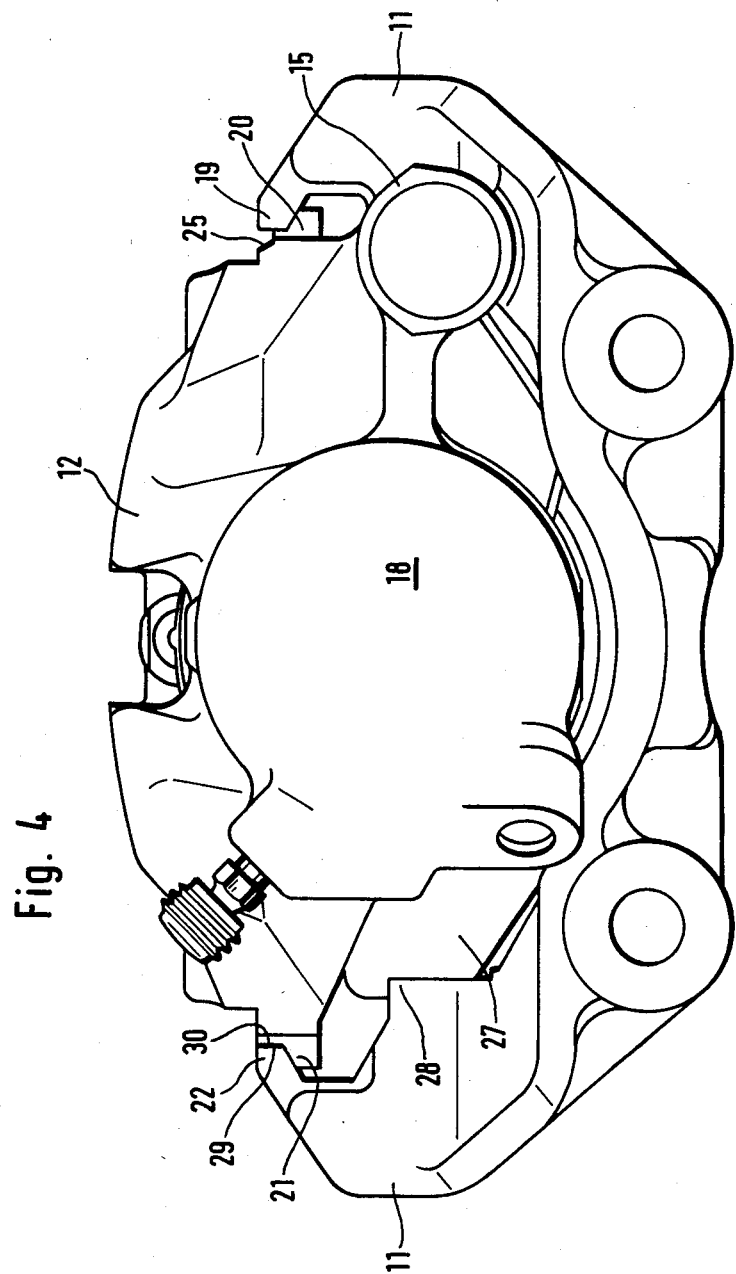
FIG. 4 is a front elevational view taken in the direction of the arrow IV in FIG. 3.

In the construction shown in FIGS. 3 and 4, the axial bolt 13 is provided on the associated brake-shoe carrying and guiding arm 11 only on one side of the cylinder housing 18. The arrangement of the extensions 30, 21, of the abutments 19, 22, of the step 25 as well as of the guiding surfaces 29, 30 in the area of the outward brake shoe 14 corresponds to the arrangement in the construction of FIGS. 1 and 2. However, in addition thereto, the disc brake according to FIGS. 3 and 4 contains an extension 21 and an abutment 22 also at the region of the inward brake shoe 27 on the side opposite to the axial bolt 13. Further, guiding surfaces 29, 30, which are effective in the circumferential direction, are disposed at the region of the extension 21 on the floating caliper 12 and at the region of the abutment 22 on the brake-shoe carrying and guiding arm 11. This provides for guidance of the floating caliper 12 on the side of the cylinder housing 18 opposite to the axial bolt 13 of such a character that the second bolt 13 may be dispensed with.

In both constructions, the abutment surfaces can be kept very small at the region of the extensions 20, 21 and the abutments 19, 22, respectively, so that they are prevented from sticking together due to rust. This renders it possible to manufacture the extensions 20, 21 and the abutments 19, 22 of the floating caliper 12 and of the brake-shoe carrying and guiding arm 11 by a simple broaching operation.

Mounting and dismounting of the floating caliper 12 is performed in the embodiment according to FIGS. 3 and 4 similarly to the construction according to FIGS. 1 and 2.

The undercut 23 and the step 25 could also be disposed on the opposite side of the floating caliper 12.

It is to be understood that in disc brakes a serious problem is to be seen in the reliability of the coupling between the brake caliper and the brake support member to resist self-acting disengagement. In a two-bolt design shown in FIG. 1, this reliability will be remarkably increased by the inventive arrangement, since there will be sufficient guiding of the brake caliper 12 at the brake support member even in the event of loss of one bolt 13. The one-bolt design of FIG. 2 is as reliable as conventional two-bolt solutions; however, it simplifies the manufacture and lowers the costs.

While we have described above the principles of our invention in connection with specific apparatus, it is to be clearly understood that this description is made only by way of example and not as a limitation to the scope of our invention as set forth in the objects thereof and in the accompanying claims.

We claim:

1. A floating-caliper spot-type disc brake for use in cooperation with a brake disc mounted on a support for rotation about a disc axis relative thereof, comprising
   a pair of brake shoes;
   means for supporting said brake shoes at opposite axial sides of the brake disc for movement substantially parallel to the disc axis toward and away from the disc, including a carrier member rigidly connected to the support at one of the axial sides of the brake disc and extending past the brake disc to the other axial side thereof;
   means for moving said brake shoes at least toward the brake disc to frictionally engage the same, including a caliper member so mounted on said carrier member for displacement substantially parallel to the disc axis as to straddle the brake disc and having two extensions, one of said extensions protruding generally circumferentially outwardly from one end of said caliper and the second of said extensions protruding substantially circumferentially outwardly from an end of said caliper opposite said one end thereof, and an actuator including two relatively substantially axially displaceable elements arranged on the one axial side of the brake disc and one directly applying braking force to the closer one of said brake shoes while the other is rigid with said caliper member to transmit the braking force through the latter to the other of said brake shoes;
   means for guiding said caliper member on said carrier member for said displacement including means for bounding at least one substantially axially extending guiding opening in one of said members, and at least one substantially axially extending guiding pin secured to the other of said members and slidingly received in said guiding opening;
   abutment means on said carrier member for said caliper member, including two abutments on said carrier member, one of said abutments extending substantially circumferentially inwardly from one end of said carrier defining a first cut-out radially inwardly of said one abutment, and the second abutment extending circumferentially inwardly from an end of said carrier opposite said one end thereof defining a second cut-out radially inwardly of said second abutment;
   means for resiliently urging said caliper member outwardly from the disc axis and generally radially of said axis into a mounted positon relative to said carrier member in which said one and said second extensions are respectively in said one and said second cut-outs engaged radially outwardly and circumferentially against said abutments; and
   said one and said second abutments and said one and said second cut-outs are dimensioned to receive the respective said one and said second extensions of said caliper member so that said caliper member may be moved against the urging of said resilient means into an assembling position in which one of said caliper member extensions is received in one of said cut-outs and said second extension is free to move substantially radially out of said second cut-out past said second abutment.

2. The disc brake as claimed in claim 1, wherein said caliper member has at least one step next to said one of said two extensions, said step being engagable with said one abutment in said assembling position.

3. The disc brake as defined in claim 1, wherein said spring is mounted on said other brake shoe and has a spring portion of a predetermined circumferential dimension which contacts said caliper member; and wherein said caliper member has a depression receiving said spring portion and having a circumferential dimension sufficiently greater than said predetermined circumferential dimension of said spring portion to permit said caliper member to conduct movement in the circumferential dimension that is needed to bring said caliper member from one of said mounted and assembled positions into the other without interference with said spring.

4. The disc brake as defined in claim 1, wherein said guiding opening and said guiding pin together constitute a guiding arrangement; wherein said guiding means further includes an additional guiding arrangement similar to said guiding arrangement and disposed at a spacing from said guiding arrangement; and wherein said abutments and extensions are arranged only at the other axial side of the brake disc.

5. The disc brake as defined in claim 4, wherein said guiding arrangements are spaced from one another in the circumferential direction.

6. The disc brake as defined in claim 1, wherein said guiding pin and said guiding opening are arranged at one circumferential end portion of the respective members; wherein said abutment and said extension disposed at said one circumferential end portion are arranged only at the other axial side of the brake disc; and wherein said abutment and said extension disposed at the other circumferential end portion of said respective members are arranged both at the one and the other axial side of the brake disc.

7. The disc brake as defined in claim 1 wherein said extensions are tooth-shaped at least in the area of said extensions adjacent said recess.

8. The disc brake as defined in claim 1 wherein said resilient means includes at least one spring.

* * * * *